April 26, 1960

R. M. COHEN 2,934,703

FREQUENCY MEASURING APPARATUS

Filed March 2, 1955

INVENTOR.
ROBERT M. COHEN
BY
*H. C. Newton*
ATTORNEY

April 26, 1960   R. M. COHEN   2,934,703
FREQUENCY MEASURING APPARATUS
Filed March 2, 1955   2 Sheets-Sheet 2

INVENTOR.
ROBERT M. COHEN
BY
*H.D.Newton*
ATTORNEY

# United States Patent Office 2,934,703
Patented Apr. 26, 1960

2,934,703

FREQUENCY MEASURING APPARATUS

Robert M. Cohen, Belleville, N.J., assignor to Radio Corporation of America, a corporation of Delaware Application March 2, 1955, Serial No. 491,620

15 Claims. (Cl. 324—70)

This invention relates to frequency measuring apparatus and in particular to a tachometer utilizing a semiconductor device for measuring the speed of internal combustion engines and the like.

It is often desired to measure the revolutions per minute (r.p.m.) of an internal combustion engine. To this end, tachometers have been employed in the past, the operation of which is essentially mechanical. In addition, electrical tachometers of many different types have also been employed for this purpose. One form of tachometer of this latter type utilizes a gas-filled electron tube which is connected to the high-voltage portion of the ignition system. The ignition voltage pulses of the engine trigger the tube to discharge a capacitor through the tube. The amount of current flowing through the tube is thus related to engine speed, and by measuring the current an indication of engine speed is obtained.

In general, most of the prior art electrical tachometers provide some means for charging and then discharging a capacitor from the high voltage portion of the ignition system of the engine. One disadvantage of utilizing the high voltage portion of the ignition system to provide the required voltage pulses is that often the particular spark plug involved fouls, so that the accuracy of the tachometer will be adversely affected.

The present invention utilizes the characteristics peculiar to semi-conductor devices such as transistors to provide new and improved frequency measuring apparatus such as, for example, a tachometer for measuring the speed of internal combustion engines. Accordingly, the low voltage portion of the ignition system may be used to provide the required voltage pulses.

It is, accordingly, an object of the present invention to provide an improved frequency meter for measuring the speed of internal combustion engines and the like, which utilizes a transistor for simplified and improved construction and operation.

It is another object of the present invention to provide a transistor tachometer, for measuring the speed of an engine, which is characterized by reliability, durability and a long useful life.

A still further object of the present invention is to provide an improved engine tachometer wherein a transistor is efficiently utilized for effecting electrical indication of the speed of the engine and for simplifying the construction of the tachometer.

It is yet another object of this invention to provide a transistorized frequency measuring circuit which may be effectively driven from any low voltage source such as the low voltage portion of the ignition system of an internal combustion engine and the like.

It is still another object of the present invention to provide an engine tachometer utilizing a transistor circuit which is stabilized for ambient temperature variations and which utilizes relatively inexpensive circuit components.

These and further objects and advantages of the present invention are achieved, in general, by a circuit arrangement wherein the primary or low voltage winding of a standard ignition coil of an internal combustion engine may be coupled to either the base or the emitter electrode of a transistor. During the period of time when the make and break contact points of the ignition circuit breaker are opened, a voltage wave is developed which is applied to the input electrode of the transistor. These voltage waves or pulses are a function of engine speed and when differentiated and applied to the transistor serve to bias the transistor into conduction. The transistor emitter or collector current is then measured and is a function of the frequency of the applied pulses and thus gives an indication of the engine speed.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figure 1:
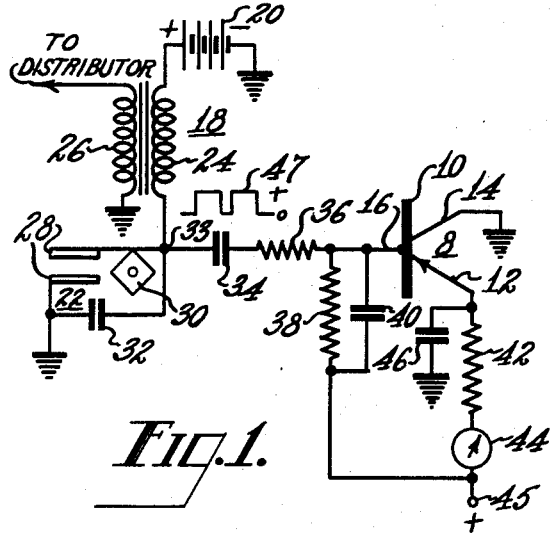
Figures 1, 3, 4, 5 and 6 are schematic circuit diagrams of tachometers including frequency measuring circuits utilizing transistors in accordance with the invention.

Referring now to the drawing, wherein like parts are indicated by like reference numerals throughout the figures, and referring particularly to Figure 1, a tachometer circuit includes, in accordance with the invention, a frequency measuring circuit including a transistor 8 and, in general, an ignition coil or step-up transformer 18, a direct current source of voltage, such as a conventional storage battery 20, and a circuit breaker 22. The transistor includes a semi-conductive body 10 with which an emitter 12, a collector 14 and a base electrode 16 are cooperatively associated. The transistor 8 may be considered to be of the P–N–P junction variety although other type transistors having characteristics similar to junction transistors could be used equally well.

The ignition coil or transformer 18 includes a primary or low voltage winding 24 and a secondary or high voltage winding 26, which is serially connected as shown between a point of fixed reference potential or ground for the system and a conventional engine distributor (not shown). The circuit breaker 22, which is also conventional, includes a pair of breaker points 28 and a cam 30. The cam 30 is conventionally a part of the distributor assembly and is mounted just beneath the distributor. The cam 30 has, it will be understood, as many lobes as there are cylinders in the engine. By way of illustrating the invention, therefore, the tachometer circuit illustrated in Figure 1 may be considered to be used in conjunction with a 4-cylinder internal combustion engine. While not shown, it should be understood that the breaker points 28 will be held in contact by a spring except when forced apart by the lobes of the cam 30. For purposes of illustration, the breaker points 28 have been illustrated as being in the open or break position. The cam 30 rotates at half the crankshaft speed for a 4-stroke cycle engine and breaks the primary circuit once for each cylinder in the engine during one complete cycle of the camshaft. A capacitor 32 is connected, as is conventional, in shunt across the breaker points.

The storage battery 20 has its negative terminal connected to ground as shown and its positive terminal connected through the primary winding 24 of the ignition coil 18 and the capacitor 32 of the circuit breaker 22 to ground, when the breaker points 28 are opened, and through the points 28 to ground when the points 28 are closed. The lower terminal 33 of the primary winding 24 is connected, in accordance with the invention, through a serially connected capacitor 34 and a current limiting resistor 36 to the base 16 of the transistor 8. The circuitry to the right of the terminal 33, as viewed in the drawing, may thus be considered to be a frequency measuring circuit.

A resistor 38, which in combination with the capacitor 34 forms a differentiating circuit, is connected from the junction of the base 16 and the resistor 36 to a terminal 45, which may be considered to be the positive terminal of the battery 20. The resistor 38 may be made variable if a calibration adjustment is desired. A capacitor 40, while not essential to the proper operation of the tachometer, is connected in parallel with the resistor 38 as an aid in preventing high frequency transients from affecting the accuracy of the tachometer. By connecting the capacitor 40 as shown, the calibration of the tachometer circuit is simplified since it will be less dependent upon variations of the frequency response characteristics of different transistors. The resistor 38 also provides a return path for the collector leakage current of the transistor and reduces the effect of this current to a negligible value.

The collector 14 of the transistor 8 is connected directly to ground, while the emitter 12 is connected through a load resistor 42 and a direct current meter 44 to the terminal 45. A capacitor 46 by-passes the emitter load resistor 42 and while not necessary to the operation of the circuit has been found to improve its sensitivity. The circuit arrangement is thus seen to be of the so-called common collector configuration, the base and emitter electrodes serving as the input and output electrodes respectively.

While it will be understood that the circuit specifications may vary according to the design for any particular application, the following circuit specifications are included for the circuit of Figure 1 for an 8-cylinder 4-cycle engine by way of example only:

Capacitors 34, 40 and 46____ .007; .001; and .5 microfarad respectively.
Resistors 36, 38 and 42_____ 56,000; 50,000; and 1200 ohms respectively.
Battery 20_____ 6 volts.

In operation, the biasing voltages are chosen so that the transistor 8 is initially non-conductive. A positive voltage wave 47 of the type illustrated in Figure 1 is developed at the terminal 33 during the time that the breaker points 28 are open. This positive voltage will have a value, in a typical case, of approximately 6 to 7.5 volts. When the breaker points 28 close, the voltage at the terminal 33 drops to substantially zero. Accordingly, a series of positive voltage pulses, or signal waves 47 are produced at the terminal 33 due to the make and break action of the circuit breaker 22.

The positive voltage waves 47 are thus applied through the capacitor 34, the current limiting resistor 36 and across the resistor 38, which in combination with the capacitor 34 comprises a differentiating network, to the base 16 of the transistor 8. The direct-current component of the voltage waves 47 is removed by the capacitor 34 and a resultant differentiated negative pulse is applied to the base 16 across the resistor 38.

By applying a negative pulse to the base of a transistor of N type conductivity, the forward bias between its emitter and base electrodes increases. By so biasing a transistor its output current will increase. Thus, the differentiated negative pulse developed across the resistor 38 will bias the transistor 8 in the forward direction, which will increase the collector current of the transistor. Accordingly, the emitter current of the transistor 8 will also increase. This increase in current is dependent on the frequency of the differentiated pulses. The frequency of these pulses is, in turn, dependent on the speed at which the breaker points 28 are opened and closed by the cam 30. Since the speed at which the cam rotates is, in turn, dependent on the speed in r.p.m. of the engine, the emitter direct current is related to the speed in r.p.m. of the engine.

Figure 2:
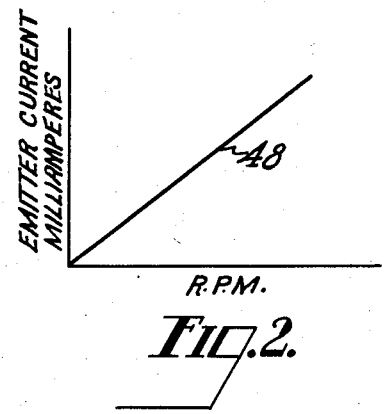
Figure 2 is a graph in which the emitter current of a transistor of the type illustrated in Figure 1 has been plotted against the speed in r.p.m. of an internal combustion engine.

In accordance with the foregoing, by measuring the emitter direct-current with the meter 44 and suitably calibrating the meter so that the current measured is read in terms of engine r.p.m., a direct indication of engine r.p.m. is easily obtained. This is shown by the curve 48 in Figure 2, where emitter direct current has been plotted against engine r.p.m. It is seen from this curve that the variations of emitter current with changes in engine r.p.m. are substantially linear.

Thus, in accordance with the invention, an extremely accurate indication of engine speed is easily obtained with a circuit arrangement which is extremely simple, reliable and efficient. Since no extra mechanical parts are required, there is no danger of mechanical wear. Also, there is no detrimental affect on the performance of the ignition system of the engine. In addition, the characteristics of the transistor are not susceptible to variations due to mechanical vibrations. Thus the calibration of the tachometer is not adversely affected by these variations. Moreover, due to the relatively low voltages required for the operation of a transistor, it is ideally suited to this type application.

Figure 3:
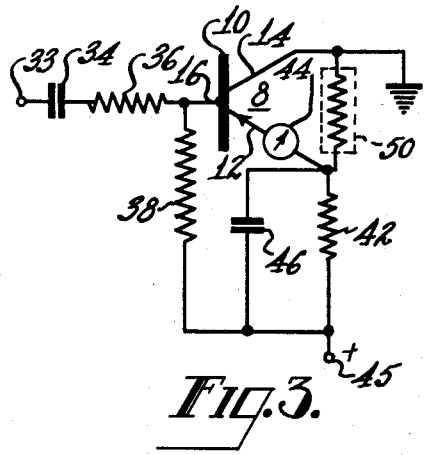

As is well known and understood, semi-conductor devices may be temperature sensitive. Accordingly, variations in the ambient temperature may cause the operating characteristics of a transistor to vary which results in unstable and unreliable circuit operation. This is particularly true at elevated temperatures. Since the circuits embodying the invention may be subjected to wide variations of ambient temperature, it may be desirable in some cases to provide means for stabilizing their operation as the temperature varies. One method of accomplishing temperature stabilization is illustrated in Figure 3, although this method should be taken as being equally applicable to any of the circuits shown. In Figure 3, a temperature sensitive impedance element, such as a thermistor 50, is connected between the emitter 12 and the collector 14 of the transistor 8. The thermistor 50 has a characteristic such that its resistance decreases with increases in temperature.

One of the characteristics of a transistor which changes with variations in temperature is the leakage saturation current ($I_{co}$) which flows from the collector to the base. Thus a rise in temperature causes the leakage saturation current of a transistor to increase. By connecting the thermistor 50 between the collector 14 and the emitter 12, however, an increasing negative voltage is applied to the emitter 12 of the transistor 8 as the temperature increases. This increasing negative emitter voltage compensates, therefore, for the increase in collector current due to the increase in the current $I_{co}$. Accordingly, the operating point of the transistor 8 is maintained substantially constant despite relatively wide variations in ambient temperature. The thermistor, in a typical application, may have a value of 50,000 ohms at 25° C.

Another difference in the circuit illustrated in Figure 3 is that the meter 44 is connected serially between the emitter 12 and the resistor 42. It has been found that this connection is preferable in those cases where a thermistor is used for temperature compensation, as in Figure 3.

Figure 4:
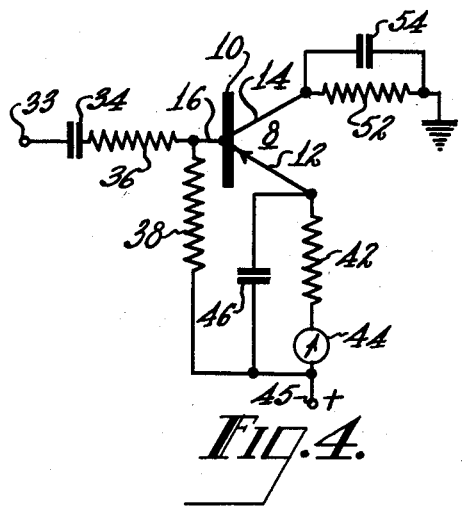

As was mentioned hereinbefore, the relation between the emitter current of the transistor and the engine speed in r.p.m. is substantially linear. In some instances it may be required or desired that precise linearity be maintained. As an example, due to frequency response limitations, the average output current of the transistor may be somewhat less than that required for the desired linear relationship at higher speeds. To achieve precise linearity in these cases, it may be found desirable to add a series resistor and a shunt capacitor to the collector circuit of the transistor. This has been illustrated in Figure 4, where the resistor 52 is connected between the collector 14 of the transistor 8 and ground, and the capacitor 54 is connected in parallel with the resistor 52. The circuit is otherwise substantially the same as the circuit illustrated in Figure 3, except that the thermistor 50 has been eliminated, although it should be understood that the thermistor could be included if its use is indicated.

The series resistor 52 provides some degeneration at lower frequency operation and the capacitor 54 is so chosen that its effect is negligible at these lower frequencies. For high frequency operation, however, the reactance of the capacitor 54 decreases and the degeneration introduced by the resistor 54 is no longer present. By properly adjusting the values of the resistor 52 and the capacitor 54, the desired scale linearity may be achieved.

While one specific form of achieving precise linearity at higher frequencies has been illustrated, others may be used. In general, the desired linearity is accomplished by introducing degeneration which is frequency dependent for lower frequency operation, so that it is not present at the higher frequencies. Accordingly, either the capacitor 46 or the capacitor 34 could be reduced in value or both these capacitors could be reduced in value to provide the desired compensation.

For some applications, the available supply voltage, such as a battery, may have its positive terminal grounded. In this case, a transistor of P type conductivity may be used. Thus, referring to Figure 5, a transistor 58 may be considered for purposes of explanation to be of the N-P-N junction type, and includes a semiconductive body 60 with which an emitter 62, a collector 64 and a base 66 are cooperatively associated. The supply battery 20 in this case has its positive terminal grounded and its negative terminal connected through the primary winding 24 of the ignition coil 18 and the capacitor 32 of the circuit breaker 22 to ground when the points 28 are open, and through the primary winding 24 and the points 28 to ground when the points are closed. In addition, the emitter 62 of the transistor 58 is connected through the load resistor 42 and the meter 44 to a terminal 49, which may be connected to the negative terminal of the supply battery.

Figure 5:
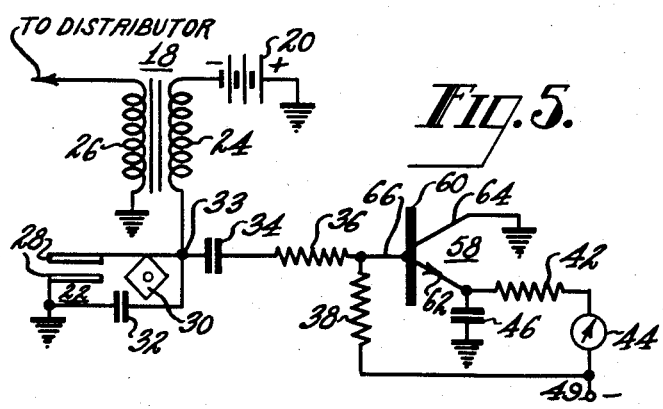

In other aspects the circuit illustrated in Figure 5 is substantially identical to the one illustrated in Figure 1 and is operative in much the same manner. One difference, of course, is that a negative voltage wave will be developed at the terminal 33 when the breaker points 28 are open. This negative voltage wave will be differentiated and the resulting positive voltage pulse which is developed across the resistor 38 will be applied to the base 66 of the transistor 58. By making the base of a P type conductivity transistor more positive or, in other words, by increasing the forward bias between its emitter and base electrodes, the output current of the transistor will increase. Thus, the current in the emitter circuit of the transistor 58 will increase as the frequency of the pulses developed at the terminal 33 increases. By measuring the emitter current by means of the meter 44, an indication of engine speed is obtained.

Figure 6:
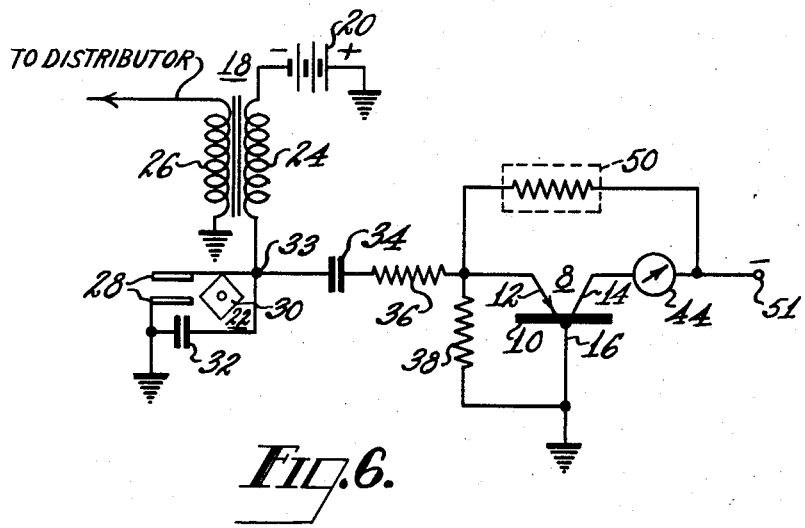

While, in general, it is preferable to apply the pulses from the low voltage portion of the ignition system to the base of a transistor, it is also possible to apply the pulses to the emitter of the transistor. One possible circuit for accomplishing this is illustrated in Figure 6 of the drawing, reference to which is now made. In this figure, the base 16 of the transistor 8 is connected directly to ground while the resistor 38 is connected between the emitter and ground. The meter 44 for measuring the output current and thus providing an indication of engine speed in r.p.m. is connected in series with the collector 14, while the thermistor 50 is connected between the collector 14 and the emitter 12. For this type of circuit, when using a transistor of N type conductivity, the positive terminal of the battery 20 is grounded. The collector 14 is connected through the meter 44 to a terminal 51, which may be connected directly to the negative terminal of the battery. If the negative terminal of the battery is grounded, the conductivity of the transistor would have to be reversed, i.e., a P type conductivity transistor would be required.

The circuit illustrated in Figure 6 is thus seen to be of the so-called common base configuration, the emitter and collector electrodes serving as the input and output electrodes respectively.

In other aspects, the circuit illustrated in Figure 6 is substantially identical to the circuit illustrated in Figure 5 of the drawing. Thus, a negative voltage wave is developed at the terminal 33 which is differentiated and the resulting positive pulse which is developed across the resistor 38 is applied to the emitter 12 of the transistor 8. This tends to bias the transistor 8 in the forward direction, which will increase its collector current. The meter 44 which is used to measure the collector current will then give an indication of engine speed, if calibrated correctly, in r.p.m.

Figure 7:
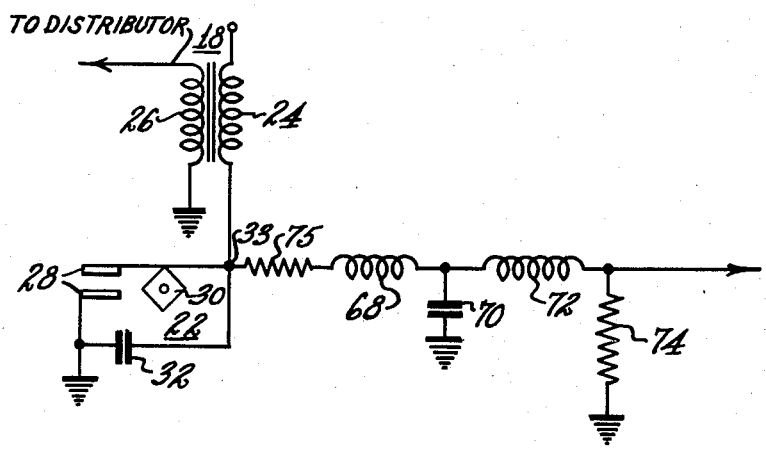
Figure 7 is a schematic circuit diagram of a low pass filter circuit which may be utilized with the tachometer circuits of the type shown in the preceding figures.

It may be required in some cases that a low pass filter or other form of pulse standardizing or shaping circuit be connected in series between the terminal 33 and the capacitor 34 of the tachometer circuit in order to remove high voltage transients which occur when the breaker points open. One type of low pass filter which may be used is illustrated in Figure 7. The filter comprises a resistor 75, a pair of serially connected inductors 68 and 72, and a capacitor 70 which is connected from the junction of the inductors to ground, and a resistor 74 which is connected from one end of the inductor 72 to ground. For a typical circuit application, the inductors 68 and 72 may be 50 millihenrys each, the capacitor 70 may have a capacitance of .015 microfarad and the resistor 74 may have a resistance of 10,000 ohms, as may the filter input termination resistor 75.

The addition of the low pass filter makes the calibration of the tachometer substantially independent of the individual ignition coil characteristics. Thus, by including a low pass filter in seriese between the terminal 33 and the capacitor 34, it is possible to design a tachometer circuit which will be operative with almost any 8-cylinder engine, for example. The tachometer circuit need only be designed in accordance with the number of cylinders and the polarity of the battery, and is not dependent on the individual make or model of the automobile. Thus, by adding a low pass filter as shown in Figure 7, tachometers in accordance with the invention may be readily adapted to mass production techniques.

It is possible, it should be understood, to operate any of the circuits illustrating the invention by capacitively coupling the tachometer circuit to the high voltage portion of the ignition system of the engine by using a very small high voltage capacitor for this purpose. A very large resistor must be placed in series with this capacitor to establish a constant current pulse supply. When this is done, the time constants of the circuit or the calibration of the circuit must be changed in accordance with the new ratio of pulse output to engine r.p.m. In the conventional gasoline engine, each spark plug fires once for every two revolutions of the drive shaft. This means that in an 8-cylinder engine the number of pulses applied to a transistor for a given engine r.p.m. is reduced to ⅛ that which is available at the low voltage portion of the engine system. The circuit time constants would, therefore, have to be increased by a factor of 8. A typical value for the high voltage coupling capacitor to one of the spark plugs would be 5 micromicrofarads and the series resistor would, for most circuit applications, be in the order of 20 megohms. This capacitor and resistor should be located close to the spark plug in order that capacitive loading effects might be avoided.

While the high voltage portion of the ignition system may be used as described above to drive the transistor tachometer, one of the advantages and features of utilizing a transistor, in accordance with the teachings of the present invention, is that the low voltage portion of the ignition system is used. This method is, therefore, to be preferred. By using the low voltage portion of the ignition system, the required circuit components are less costly and, in addition, the adverse effects that spark plug fouling may have on the accuracy of the tachometer are avoided.

As described herein, frequency measuring apparatus in accordance with the invention is extremely simple and reliable in operation and ideally suited for use in measuring the speed in r.p.m. of internal combustion engines. Not only are the circuits characterized by the advantages inherent in transistors, such as small size and durability, but by utilizing a transistor in the circuit arrangements shown and described a saving in circuit components is possible. Thus, tachometers in accordance with the invention are not only durable and reliable in operation, but also relatively inexpensive.

What is claimed is:

1. A frequency measuring circuit for measuring the speed of an internal combustion engine having an electrical ignition system comprising, in combination, a transistor including an input, an output and a common grounded electrode, input circuit means for said transistor coupled with said input electrode, means for deriving a voltage wave the frequency of which is related to the speed of said engine directly from said ignition system, means for applying said voltage wave to said input circuit means to bias said transistor in the forward current-conducting direction and to vary the current flow in said output electrode in accordance with the frequency of said voltage wave, and current measuring means serially connected with said output electrode for measuring said current flow to provide an indication of the speed of said engine.

2. The combination with an internal combustion engine having an ignition system which includes circuit breaker points for timing said system, of a transistor including an emitter, a collector and a base electrode, means for directly deriving from said ignition system a voltage wave in response to the timing operation of said breaker points, means for applying said voltage wave to said base electrode to bias said transistor in the forward current-conducting direction and to vary the current flow in said emitter electrode in accordance with the frequency of said voltage wave, and current measuring means connected with said emitter electrode for measuring said current flow and calibrated to provide an indication of the speed of said engine.

3. A frequency measuring circuit for measuring the speed of an internal combustion engine having an electrical ignition system comprising, in combination, a transistor including an input, an output and a common grounded electrode, input circuit means for said transistor including a differentiating network connected with said input electrode, means for applying a voltage wave the frequency of which is related to the speed of said engine directly from said ignition system to said input circuit means to bias said transistor in the forward current-conducting direction, and current measuring means serially connected with said output electrode for measuring the current flow therein to provide an indication of the speed of said engine.

4. A frequency measuring circuit as defined in claim 3, wherein a temperature sensitive impedance element is serially connected between said output electrode and one of said input and common electrodes.

5. A frequency measuring circuit as defined in claim 3, wherein said ignition system includes an ignition transformer having a primary and a secondary winding, and wherein one terminal of said primary winding is coupled with said input circuit for applying said voltage wave thereto.

6. A frequency measuring circuit as defined in claim 3, wherein said transistor is of the P-N-P junction type.

7. A frequency measuring circuit as defined in claim 3, wherein said transistor is of the N-P-N junction type.

8. An engine tachometer for providing an indication of the speed of an internal combustion engine having an ignition system which includes an ignition transformer, said transformer including a primary and a secondary winding, an ignition battery, and circuit breaker points, means connecting one terminal of said battery, said primary winding and said breaker points in series, the other terminal of said battery being connected to a point of reference potential, comprising, in combination; a transistor including an emitter, a collector and a base electrode; conductive means connecting said collector electrode to said point of reference potential; means including a current limiting resistor and a differentiating network connecting the junction of said primary winding and said breaker points with said base electrode for applying a voltage wave thereto in response to the timing operation of said breaker points; and a load resistor and current measuring means serially connected between said emitter electrode and said one terminal of said battery; current measuring means being adapted to provide an indication of the speed of said engine.

9. An engine tachometer as defined in claim 8, wherein a temperature sensitive impedance element is connected from the junction of said load resistor and said emitter electrode to said collector electrode.

10. An engine tachometer as defined in claim 8, wherein a resistor is serially connected with said collector electrode and a capacitor is connected in parallel with said resistor.

11. An engine tachometer for providing an indication of the speed of an internal combustion engine having an ignition system which includes an ignition transformer, said transformer including a primary and a secondary winding, an ignition battery, and circuit breaker points, means connecting one terminal of said battery, said primary winding and said breaker points in series; the other terminal of said battery being connected to a point of reference potential, comprising, in combination; a transistor including an emitter, a collector and a base electrode; conductive means connecting said base electrode to said point of reference potential; means including a current limiting resistor and a differentiating network connecting the junction of said primary winding and said breaker points with said emitter electrode for applying a voltage wave thereto in response to the timing operation of said breaker points; and current measuring means connected between said collector electrode and said one terminal of said battery; said current measuring means being adapted to provide an indication of the speed of said engine.

12. An engine tachometer for providing an indication of the speed of an internal combustion engine having an ignition system which includes an ignition transformer, said transformer including a primary and a secondary winding, and circuit breaker points connected with said primary winding; comprising, in combination, a transistor having an emitter, a collector and a base electrode; conductive means connecting said base electrode to a point of reference potential; means including a differentiating network connecting the junction of said primary winding and said breaker points with said emitter electrode for applying a voltage wave thereto in response to the timing operation of said breaker points, and current measuring means serially connected with said collector electrode for measuring the current flow therein to provide an indication of the speed of said engine.

13. An engine tachometer as defined in claim 2, wherein said means connecting the junction of said primary winding and said breaker points with said emitter electrode includes a low pass filter.

14. An engine tachometer for providing an indication of the speed of an internal combustion engine having an ignition system which includes an ignition transformer, said transformer including a primary and a secondary winding, and circuit breaker points connected with said primary winding, comprising, in combination; a transistor having an emitter, a collector and a base electrode; conductive means connecting said collector electrode to a point of reference potential; means including a differentiating network connecting the junction of said primary winding and said breaker points with said base electrode for applying a voltage wave thereto in response to the timing operation of said breaker points; and current measuring means serially connected with said emitter electrode for measuring the current flow therein to provide an indication of the speed of said engine.

15. An engine tachometer as defined in claim 14, wherein said means connecting the junction of said primary winding and said breaker points with said base electrodes includes a low pass filter.

References Cited in the file of this patent

UNITED STATES PATENTS

| | | |
|---|---|---|
| 1,929,259 | Rich | Oct. 3, 1933 |
| 2,108,014 | Jones | Feb. 8, 1938 |
| 2,221,591 | Lansdale | Nov. 12, 1940 |
| 2,249,420 | Engbert et al. | July 15, 1941 |
| 2,335,247 | Hanson | Nov. 30, 1943 |
| 2,451,404 | Norman | Oct. 12, 1948 |
| 2,525,046 | Richter | Oct. 10, 1950 |
| 2,559,849 | Covert | July 10, 1951 |
| 2,598,874 | Agin | June 3, 1952 |
| 2,668,944 | Schwyn | Feb. 9, 1954 |
| 2,751,553 | McEntee | June 19, 1956 |
| 2,848,564 | Keonjian | Aug. 19, 1958 |

UNITED STATES PATENT OFFICE
CERTIFICATE OF CORRECTION

Patent No. 2,934,703            April 26, 1960

Robert M. Cohen

It is hereby certified that error appears in the printed specification of the above numbered patent requiring correction and that the said Letters Patent should read as corrected below.

Column 6, line 49, for "seriese" read -- series --; column 8, line 33, before "current" insert -- said --; column 9, line 5, for the claim reference numeral "2" read -- 12 --.

Signed and sealed this 29th day of November 1960.

(SEAL)
Attest:

KARL H. AXLINE
Attesting Officer

ROBERT C. WATSON
Commissioner of Patents